United States Patent
Shibata

(10) Patent No.: US 7,540,798 B2
(45) Date of Patent: Jun. 2, 2009

(54) EYEGLASS LENS PROCESSING APPARATUS

(75) Inventor: Ryoji Shibata, Toyokawa (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/756,205

(22) Filed: May 31, 2007

(65) Prior Publication Data

US 2007/0298686 A1 Dec. 27, 2007

(30) Foreign Application Priority Data

May 31, 2006 (JP) ............................. 2006-152903

(51) Int. Cl.
*B24B 9/08* (2006.01)
(52) U.S. Cl. ............................. 451/5; 451/43; 451/225
(58) Field of Classification Search ................ 451/5, 451/8–11, 15, 41, 42, 43, 69, 70, 178, 180, 451/211, 240, 247, 255, 256, 332, 362, 390, 451/398, 285–290
See application file for complete search history.

(56) References Cited

U.S. PATENT DOCUMENTS

| | | |
|---|---|---|
| 5,333,412 A | 8/1994 | Matsuyama |
| 6,089,957 A | 7/2000 | Shibata |
| 6,478,657 B1 | 11/2002 | Shibata |
| 6,790,124 B2 * | 9/2004 | Shibata ........................... 451/5 |
| 6,942,542 B2 * | 9/2005 | Shibata ........................... 451/5 |
| 7,125,314 B2 * | 10/2006 | Shibata ........................... 451/5 |
| 2006/0240747 A1 | 10/2006 | Natsume et al. |

FOREIGN PATENT DOCUMENTS

| | | |
|---|---|---|
| EP | 1510290 A1 | 3/2005 |
| JP | 4-93164 A | 3/1992 |
| JP | 2003145328 A | 5/2003 |
| JP | 200574560 A | 3/2005 |
| JP | 2005212034 A | 8/2005 |

* cited by examiner

*Primary Examiner*—Robert Rose
*Assistant Examiner*—Joseph J. Hail, III
(74) *Attorney, Agent, or Firm*—Sughrue Mion, PLLC

(57) ABSTRACT

An eyeglass lens processing apparatus includes: an endmill that bevels a periphery of lens by a tip thereof so that an angle made by a bevel and a bevel foot substantially coincides with an angle of the tip; a moving unit that includes an inclining unit that inclines the endmill relative to the lens chuck; an operating portion that calculates front surface side beveling data and rear surface side beveling data; and a control portion that controls the moving unit based on the front surface side beveling data to bevel the front surface side of the lens and controls the moving unit based on the rear surface side beveling data to bevel the rear surface side of the lens.

6 Claims, 13 Drawing Sheets

EYEGLASS LENS PROCESSING APPARATUS

BACKGROUND OF THE INVENTION (1) Field of the Invention

The present invention relates to an eyeglass lens processing apparatus for processing a periphery of an eyeglass lens.

(2) Description of the Related Art

An eyeglass lens processing apparatus capable of forming a bevel at a periphery of an eyeglass lens, including a beveling grindstone having a beveling groove in a V-like shape constitutes the main stream. Generally, a large-sized beveling grindstone having a diameter equal to or larger than 100 mm is used in consideration of a consuming property similar to a roughening grindstone.

In recent years, according to an eyeglass frame, owing to a variety of its formation, a frame having a rim having a large warp (hereinafter, also referred to as a frame curve) has been increased. When a lens is fitted to such a rim, a lens having a large warp (hereinafter, also referred to as a lens curve) is selected. Further, a periphery of a selected lens having a steep lens curve is formed with a bevel in a path of a steep curve to match an inner groove of a rim having a steep frame curve.

However, when a bevel having a path in a steep curve is formed by a general beveling grindstone having a large diameter, a beveling groove of the beveling grindstone and the formed bevel interfere with each other to bring about an error of processing the bevel.

Further, such a problem can be dealt with by providing a small diameter beveling grindstone to the apparatus other than the general large-diameter beveling grindstone. However, the beveling grindstone is expensive, further, the beveling groove has a fixed shape, and therefore, a formable shape of the bevel is considerably limited.

SUMMARY OF THE INVENTION

A technical problem of the invention is to provide an eyeglass lens processing apparatus capable of forming a bevel in a path of a steep curve and capable of forming bevels in various shapes without using a beveling grindstone.

In order to resolve the above-described problem, the intention is characterized by having the following arrangement.

(1) An eyeglass lens processing apparatus for processing a periphery of an eyeglass lens comprising:

a lens chuck that holds the lens;

an endmill that bevels a periphery of the lens by a tip so that an angle made by a formed bevel and a foot thereof substantially coincides with an angle of a tip of the endmill;

a moving unit that includes an inclination unit for inclining the endmill relative to the lens chuck for changing a positional relationship between the lens chuck and the endmill;

an operating portion that calculates a front surface beveling data including an angle of inclination of the endmill for simultaneously forming the bevel and the foot thereof on a front surface side of the lens by the endmill, and a rear surface beveling data including the angle of inclination of the endmill for simultaneously forming the bevel and the foot thereof on a rear surface side of the lens by the endmill; and a control portion for beveling the front surface side of the lens by controlling the moving unit based on the front surface beveling data and beveling the rear surface side of the lens by controlling the moving unit based on the rear surface beveling data.

(2) The eyeglass lens processing apparatus according to (1), further comprising a setting portion that sets beveling heights and beveling angles of the front and the rear surface sides of the lens, respectively, wherein the operating portion calculates the front surface beveling data and the rear surface beveling data based on the set beveling heights and the set beveling angles.

(3) The eyeglass lens processing apparatus according to (1) further comprising a beveling grindstone having a beveling groove in a V-like shape and grinding surfaces on opposite sides thereof, wherein the tip angle of the endmill substantially coincides with an angle made by the beveling groove and the grinding surface of the beveling grindstone.

(4) The eyeglass lens processing apparatus according to (3) further comprising selecting means for selecting to use either of the beveling grindstone and the endmill in beveling.

DESCRIPTION OF THE PREFERRED EMBODIMENTS

Figure 1:
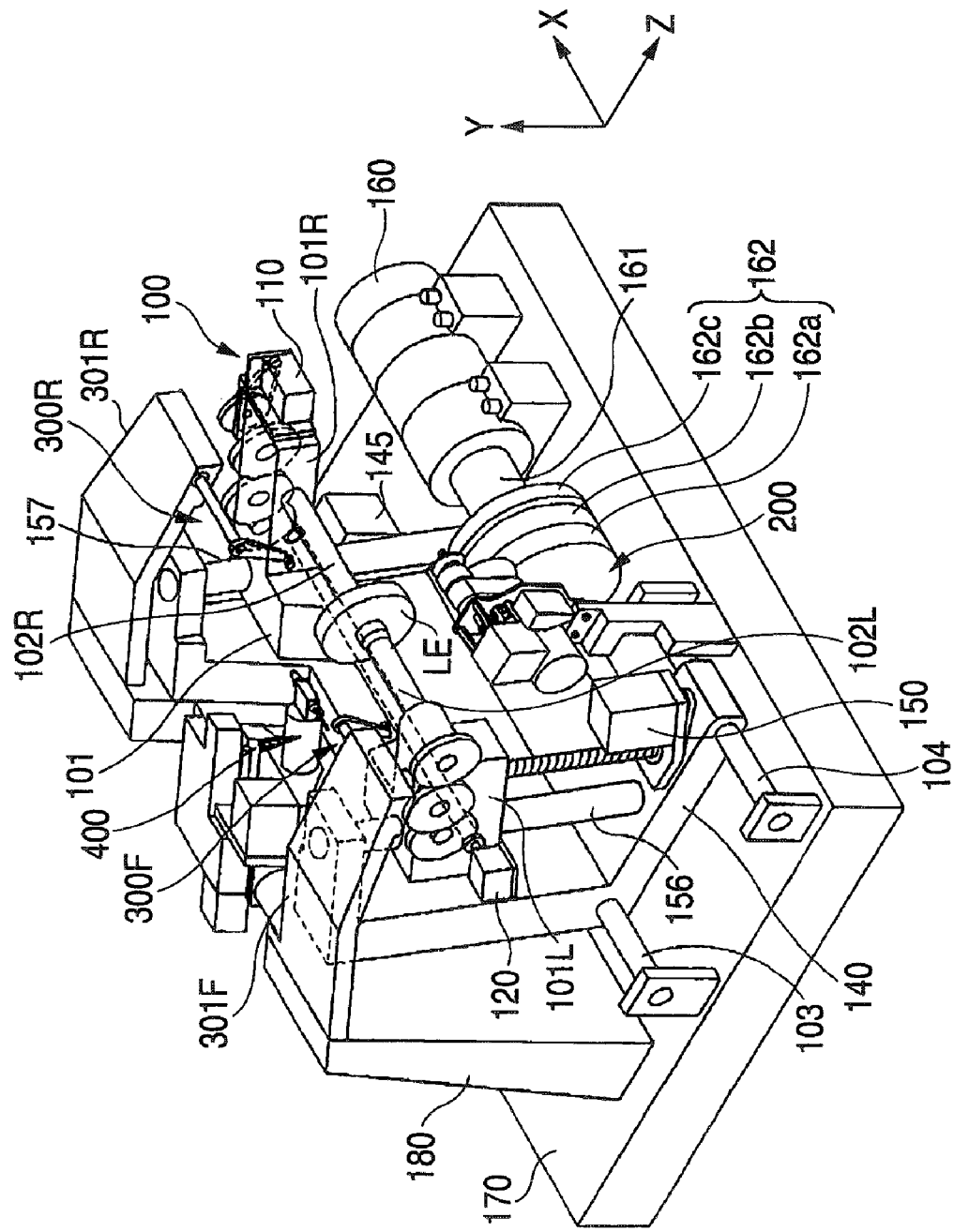
FIG. 1 is a diagram schematically illustrating a configuration of a processing portion of an eyeglass lens processing apparatus according to an embodiment of the invention.

Embodiments according to the invention will be described with reference to the drawings as follows. FIG. 1 is a diagram schematically illustrating a configuration of a processing portion of an eyeglass lens processing apparatus according to an embodiment of the invention.

A carriage portion 100 including a carriage 101 and its moving mechanism is mounted on a base 170. A lens LE to be processed is held (chucked) by lens chucks 102L and 102R rotatably held by the carriage 101 to be rotated thereby, and is ground by a grindstone 162 as a processing tool attached to a grindstone spindle 161 rotated by a grindstone rotating motor 160 fixed onto the base 170. The grindstone 162 of the embodiment includes a roughening grindstone 162a, a bevel-finishing and flat-finishing grindstone 162b, and a bevel-polishing and flat-polishing grindstone 162c. The grindstones 162a through 162c have the same diameter (diameter of about 100 through 120 mm) and is coaxially attached to the grindstone spindle 161.

The lens chucks 102L and 102R are held by the carriage 101 such that center axes thereof (a center axis of the rotating lens LE) are in parallel with a center axis of the grindstone spindle 161 (a center axis of the rotating grindstone 162). The carriage 101 is movable in a direction of the center axis of the grindstone spindle 161 (direction of the center axes of the lens chucks 102L and 102R) (X axis direction), further, movable in a direction orthogonal to the X axis direction (direction in which a distance between the center axes of the lens chucks 102L and 102R and the center axis of the grindstone spindle 161 is changed) (Y axis direction).

The lens chuck 102L is held by a left arm 101L and the lens chuck 102R is held by a right arm 101R of the carriage 101 rotatably and coaxially. The right arm 101R is fixed with a lens holding (chucking) motor 110, and the lens chuck 102R is moved in a direction of the center axis thereof by rotating the motor 110. Thereby, the lens chuck 102R is moved in a direction of approaching the lens chuck 102L and the lens LE is held (chucked) by the lens chucks 102L and 102R. Further, the left arm 101L is fixed with a lens rotating motor 120, the lens chucks 102L and 102R are rotated in synchronism with each other by rotating the motor 120 and the held (chucked) lens LE is rotated.

A moving support base 140 is movably supported by guide shafts 103 and 104 fixed onto the base 170 in parallel therewith and extended in the X axis direction. Further, an X axis direction moving motor 145 is fixed onto the base 170, the support base 140 is moved in the X axis direction by rotating the motor 145, and the carriage 101 supported by guide shafts 156 and 157 fixed to the support base 140 is moved in the X axis direction.

The carriage 101 is movably supported by the guide shafts 156 and 157 fixed to the support base 140 in parallel therewith and extended in the Y axis direction. Further, the support base 140 is fixed with a Y axis direction moving motor 150 and the carriage 101 is moved in the Y axis direction by rotating the motor 150.

Figure 2:
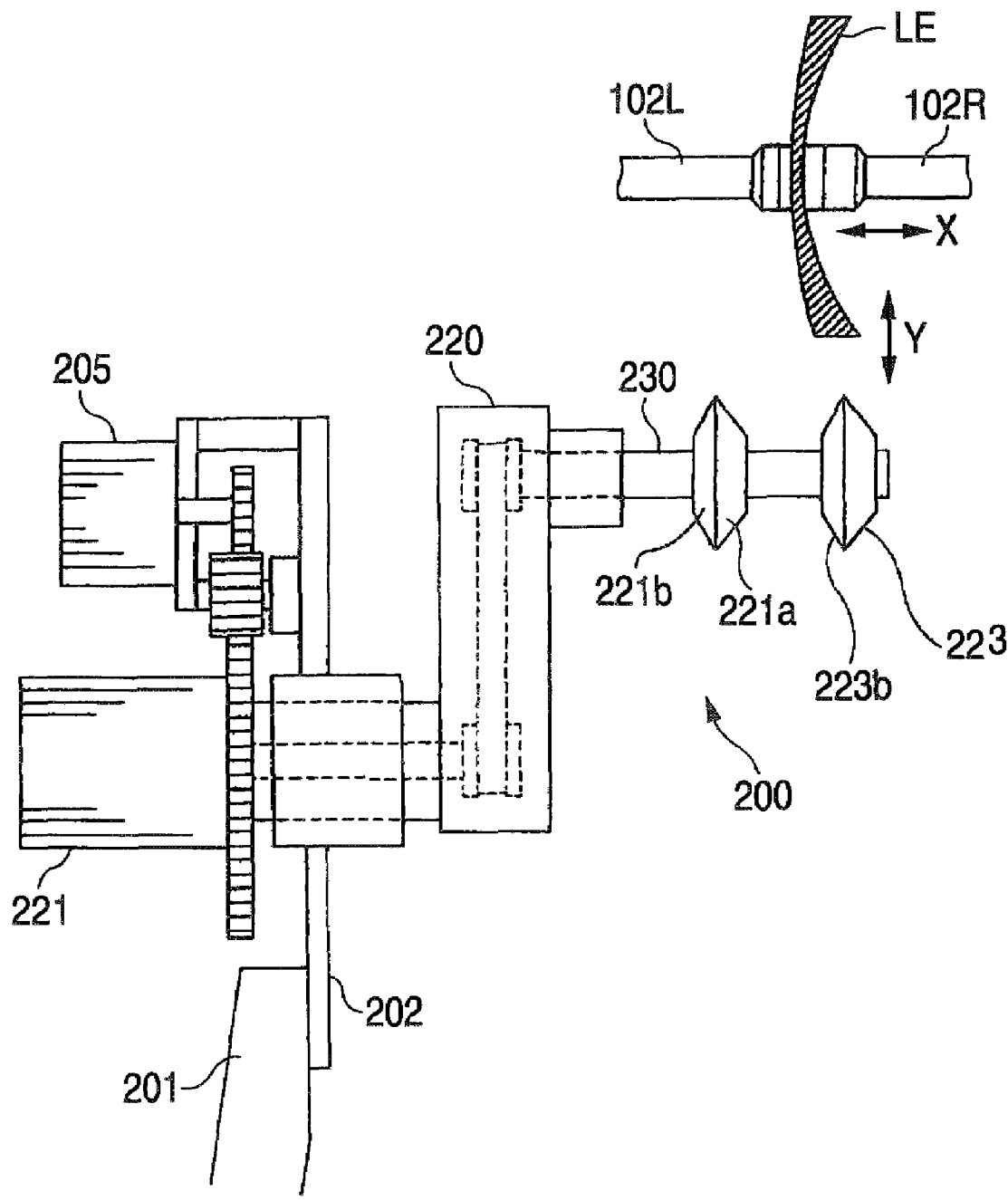
FIG. 2 is a diagram schematically illustrating a configuration of a chamfering portion.

A chamfering portion 200 is arranged on a front side of the carriage portion 100. FIG. 2 is a diagram schematically illustrating a configuration of the chamfering portion 200. An arm 220 is rotatably held by a plate 202 fixed to a fixed support base 201 on the base 170. A grindstone spindle 230 rotatably held by the arm 220 is coaxially attached with finish-chamfering grindstone 221a for a front refracting surface (hereinafter, front surface) of the lens LE, a finish-chamfering grindstone 221b for a rear refracting surface (hereinafter, rear surface) of the lens LE, abolish-chamfering grindstone 223a for the front surface of the lens LE, and a polish-chamfering grindstone 223b for the rear surface of the lens LE. The grindstones 221a, 221b, 223a and 223b have the same diameter, respective processing surfaces of the grindstones 221a and 223a are provided with the same inclination angle, and also respective processing surfaces of the grindstones 221b and 223b are provided with the same inclination angle. Further, the plate 202 is fixed with a grindstone moving motor 205, the arm 220 is rotated by rotating the motor 205, and the grindstone spindle 230 is moved between an escaping position and a processing position. The processing position of the grindstone spindle 230 is disposed at a position on a plane between the lens chucks 102R and 102L and the grindstone spindle 161 at which the center axes of the both are disposed.

Further, the arm 220 is fixed with a grindstone rotating motor 221 and the grindstone spindle 230 is rotated by rotating the motor 221.

Figure 3:
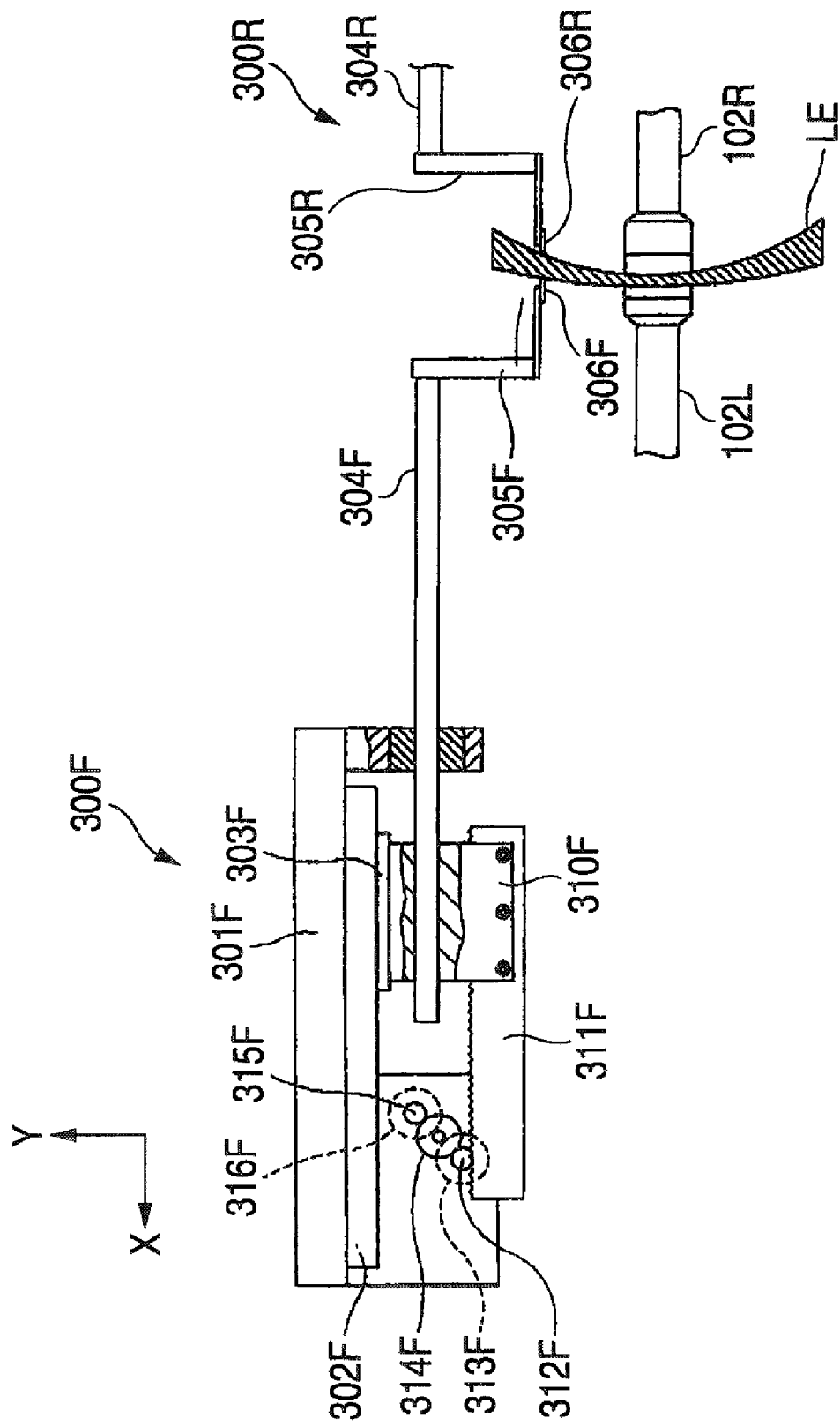
FIG. 3 is a diagram schematically illustrating a configuration of a lens measuring portion.

Lens measuring portions 300F and 300R are arranged above the carriage portion 100. FIG. 3 is a diagram schematically illustrating a configuration of the lens measuring portion 300F for measuring a front surface shape (front edge path after having been finished) of the lens LE. A fixed support base 301F fixed to a stand 180 on the base 170 is fixed with a guide rail 302F extended in the X axis direction, and a slider 303F fixed with a movable support base 310F is movably supported by the guide rail 302F. The support base 310F is fixed with a measuring feeler arm 304F, a front end of the arm 304F is fixed with a measuring feeler hand 305F in an L-like shape, and a front end of the hand 305F is attached with a measuring feeler 306F in a circular disc shape. When the front surface shape of the lens LE is measured, the measuring feeler 306F is brought into contact with the front surface of the lens LE.

A lower portion of the support base 310F is fixed with a rack gear 311F, and the rack gear 311F is brought in mesh with a gear 312F attached to a rotating shaft of an encoder 313F fixed to the support base 301F. Further, the support base 301F is fixed with a lens measuring motor 316F, rotation of the motor 316F is transmitted to the rack gear 311F by way of a gear 315F attached to a rotating shaft of the motor 316F and a gear 314F and the gear 312F and the rack gear 311F, the support base 310F, the arm 304F and the like are moved in the X axis direction. In measuring, the motor 316F presses the measuring feeler 306F to the lens LE always by constant force. The encoder 313F detects an amount of movement of the support base 310F and the like (position of the measuring feeler 306F) in the X axis direction. The front surface shape of the lens LE is measured by the movement amount (position) and an angle of rotation of the lens chucks 102L and 102R.

Further, the lens measuring portion 300R for measuring a rear surface shape (rear edge path after having been finished) of the lens LE is symmetrically with the lens measuring portion 300F in a left and right direction, and therefore, an explanation of the structure will be omitted.

Figure 4:
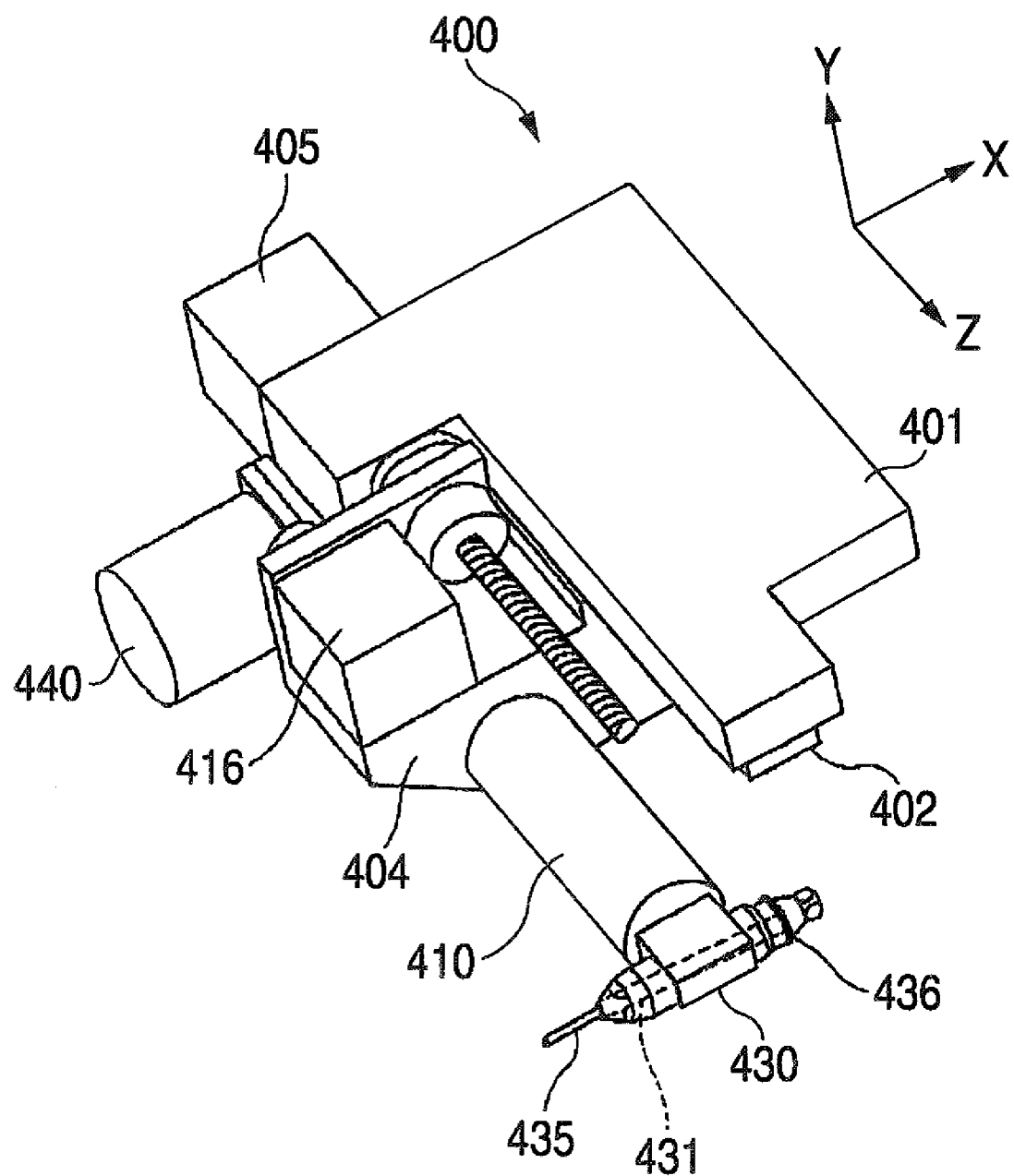
FIG. 4 is a diagram schematically illustrating a configuration of a beveling and grooving portion.

A beveling and grooving portion 400 is arranged on a back side of the carriage portion 100. FIG. 4 is a diagram schematically illustrating a configuration of the beveling and grooving portion 400. A fixed support base 401 fixed to the stand 180 is fixed with a guide rail 402 extended in a Z axis direction (a direction orthogonal to an XY axes plane), and a slider, not illustrated, fixed with a moving support base 404 is movably supported by the guide rail 402. The support base 401 is fixed with a Z axis direction moving motor 405 and the support base 404 is moved in the Z axis direction by rotating the motor 405. Further, a rotatable support base 110 is rotatably held by the support base 404. The support base 404 is fixed with a holder rotating motor 416, and the support base 410 is rotated centering on a center axis thereof by rotating the motor 416.

A front end of the support base 410 is provided with a processing tool holder 430 for holding a processing tool. The holder 430 is moved in the Z axis direction by moving the support base 404 by the motor 405 and is rotated by rotating the support base 410 by rotating the motor 416. A rotating shaft 431 having a center axis orthogonal to the center axis of the support base 410 is held by the holder 430, one end of the shaft 431 is attached with an endmill 435 as a beveling (bevel-finishing) tool, and other end thereof is attached with a grooving cutter (or grindstone) 436 as a grooving tool. The support base 410 is fixed with an endmill and cutter rotating motor 440, the shaft 431 is rotated by rotating the motor 440, and the endmill 435 and the cutter 436 attached to the shaft 431 are rotated.

Figure 5A:
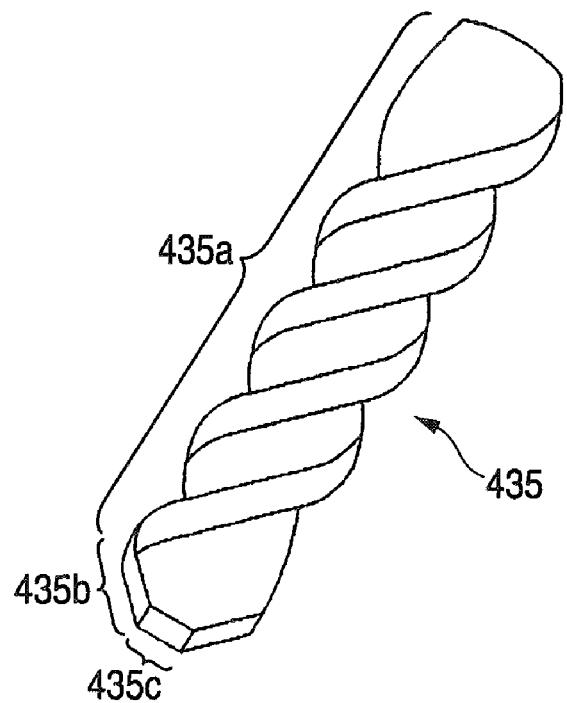
FIG. 5A and FIG. 5B are diagrams showing an endmill.
Figure 5B:
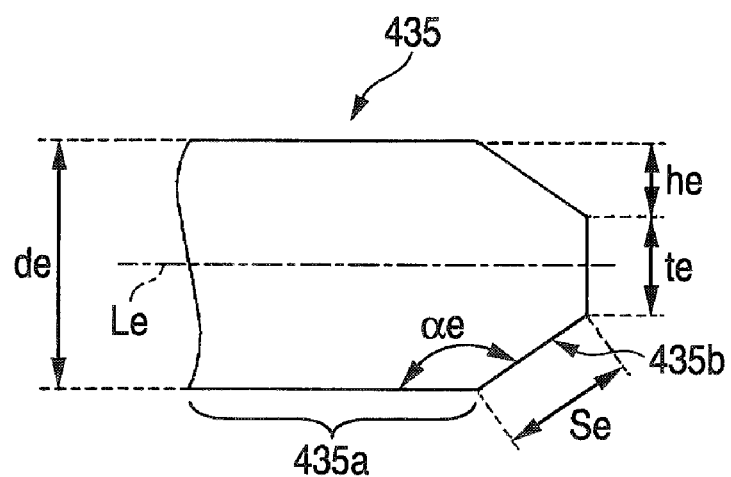
Figure 6:
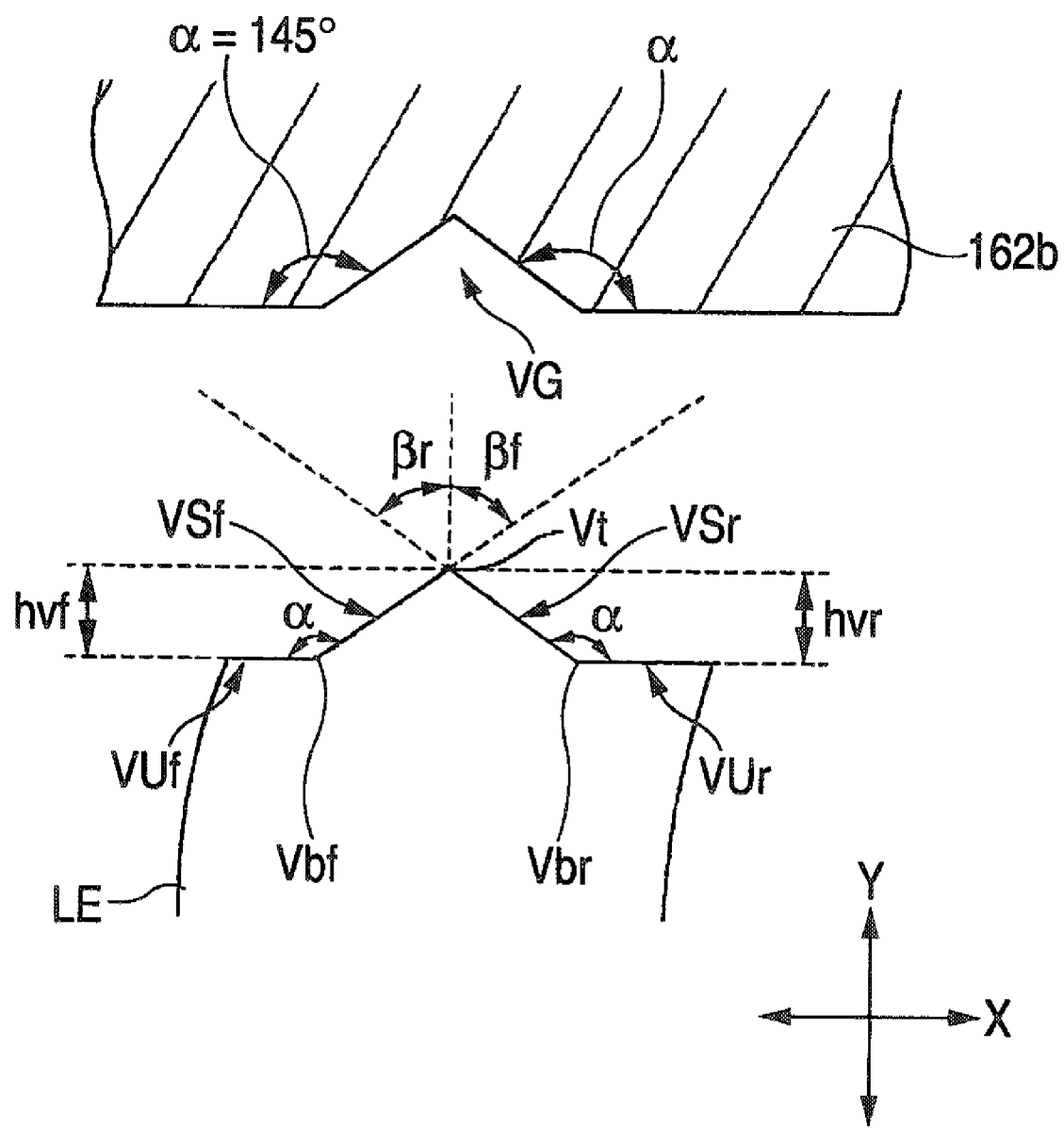
FIG. 6 is a diagram showing a beveling groove of a bevel-finishing and flat-finishing grindstone.

FIG. 5A and FIG. 5B are diagrams showing the endmill 435, FIG. 5A is an external view of the endmill 435 and FIG. 5B is a sectional diagram of a three-dimensional shape when the endmill 435 is rotated at high speed. FIG. 6 is a diagram showing a beveling groove of the grindstone 162b.

A tip of the endmill 435 has a shape capable of simultaneously processing (forming) a bevel (bevel incline) and a foot thereof on the front surface side or the rear surface side of the lens LE. The endmill 435 of the embodiment includes a first edge portion 435a constituting a cylindrical surface edge 435a by high speed rotation and a second edge portion 435b constituting a conical surface edge 435b by high speed rotation. A front end surface 435c of the second edge portion 435b is made to be orthogonal to a rotational center axis Le of the endmill 435. This is because at a vicinity of the center axis Le of the endmill 435 (within a range of about 1 mm in a diameter around the center axis Le), a machining function by rotating the endmill 435 is small, and therefore, the vicinity does not function as a machine tool. Therefore, it is preferable to ensure the second edge portion 435b out of a range larger than 1 mm in a diameter around the center axis Le.

An angle αe made by the first edge portion 435a and the second edge portion 435b is an obtuse angle and substantially coincides with an angle α made by a bevel (bevel incline) VSf (VSr) and a bevel foot VUf (VUr) formed by a beveling groove VG of the grindstone 162b and grinding surfaces on both sides thereof. According to the embodiment, the angle α on the front surface side of the lens LE and the angle α on the rear surface side of the lens LE are 145° in the same manner.

Further, a width Se of the second edge portion 435b has a dimension capable of ensuring at least a height hvf(hvr) of a bevel (a distance from a bevel apex Vt to a bevel bottom Vbf (Vbr)) formed by the grindstone 162b. That is, a height he from the first edge portion 435a to the front end of the second edge portion 435b is larger than the bevel height hvf(hvr). According to the embodiment, the bevel height hvf(hvr) is about 0.9 mm, and the tip height he is about 1.05 mm. A diameter de of the endmill 435 has a size ensuring at least a length twice as much as the tip height he and a length te of the front end surface 435c, according to the embodiment, the length Se of the second edge portion 435b is equal to or larger than 1.83 mm and the diameter de of the endmill 435 is about 3 mm. When the diameter de of the endmill 435 is excessively large, interference in beveling is liable to be brought about and a mechanism of holding the holder 430 for rotatably holding the endmill 435 is enlarged. It is preferable that the diameter de of the endmill 435 is equal to or smaller than 10 mm and it is preferable that the length of the first edge portion 435a is equal to or larger than 10 mm.

Further, the structure of the carriage portion 100 and the lens measuring portions 300F and 300R and the beveling and grooving portion 400 are basically similar to those described in U.S. Pat. No. 6,790,124 (JP-A-2003-145328). Further, the structure of the chamfering portion 200 is basically similar to that described in U.S. Pat. No. 6,478,657 (JP-A-2001-18155).

Figure 7:
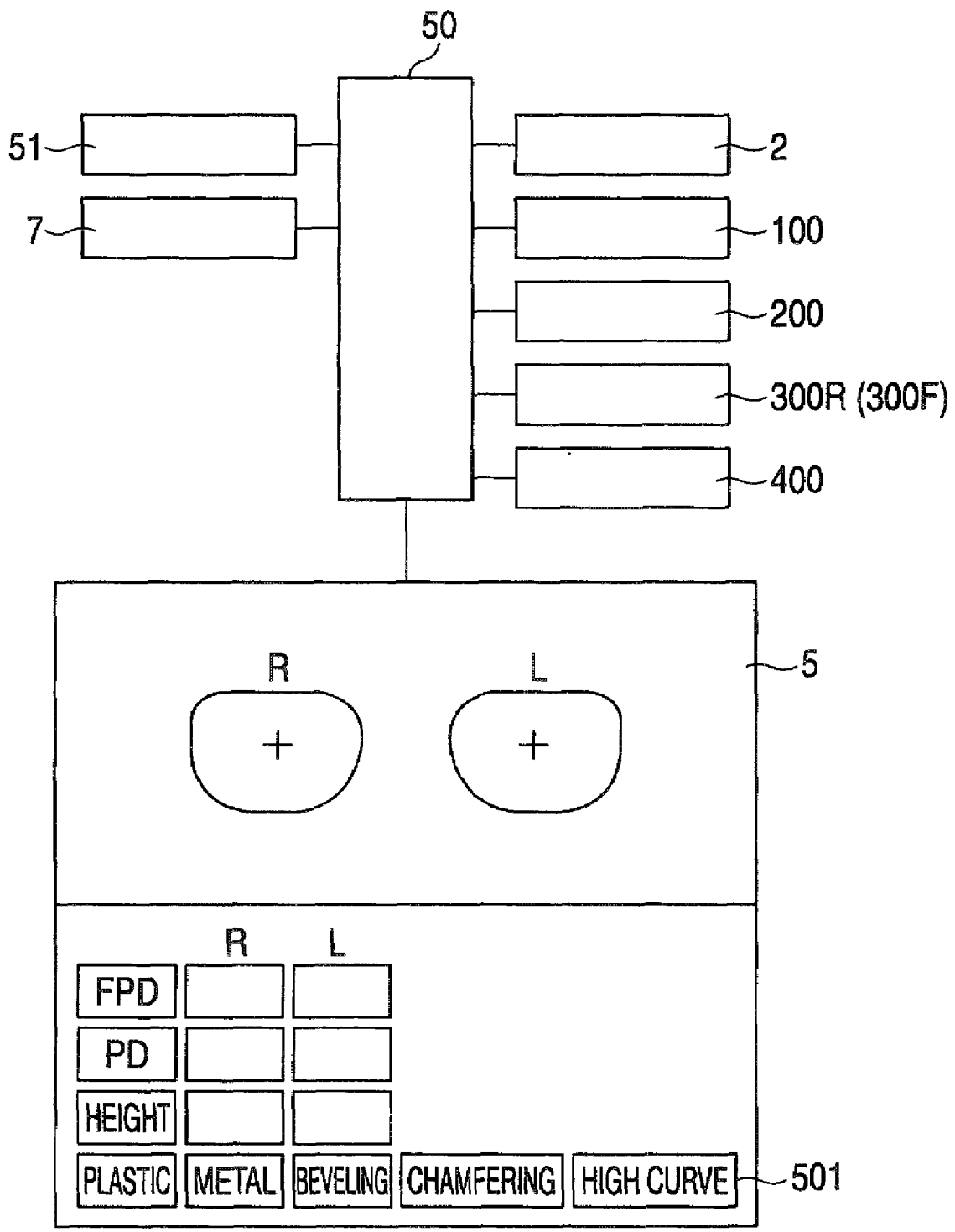
FIG. 7 is an outline block diagram of a control system of the eyeglass lens processing apparatus.

FIG. 7 is a schematic block diagram of a control system of the apparatus. An operation control portion 50 is connected with an eyeglass frame measuring apparatus 2 (an apparatus described in U.S. Pat. No. 5,333,412 (JP-A-4-93164) or the like can be used therefor), a touch screen type display (touch panel) 5 as a display portion and an input portion, a switch portion 7, a memory 51, the carriage portion 100, the chamfering portion 200, the lens measuring portions 300F and 300R, the beveling and grooving portion 400 and the like.

Further, the display portion and the input portion may not be used commonly as in a touch panel but may be separated from each other.

Operation of the apparatus having the above-described structure will be explained centering on operation of bevel-finishing.

Shapes of left and right rims of an eyeglass frame are measured by the measuring apparatus 2 to provide target lens shape data. The target lens shape data (Rn, θn) (n=1, 2, . . . , N) from the measuring apparatus 2 is inputted by depressing a communication button displayed on the display 5 and stored into the memory 51. Further, notation Rn designates a radius length from a geometrical center of the target lens shape, notation θn designates a radius angle. When the target lens shape data is inputted, a front contour diagram FT based on the target lens shape data is displayed on a screen of the display 5 (refer to FIG. 7). A button displayed on the display 5 is operated by a stylus pen (may be a finger or the like), and layout data of a frame pupillary distance (FPD), a pupillary distance (PD) of a wearer, a height of an optical center of the lens relative to the geometrical center of the target lens shape and the like are inputted. Further, as a kind of the eyeglass frame, a full-rim frame is set. Further, the target lens shape data may be inputted from a data base or the like, not illustrated.

Further, processing conditions of a material of a lens, a processing mode (bevel-finishing, flat-finishing, grooving), presence/absence of chamfering and the like can be set by operating predetermined buttons displayed on the display 5. Here, a case of setting the bevel-finishing mode will be explained.

Further, when it is known that a frame curve of the rim is large, a high curve mode can be selected by a predetermined button 501 displayed on the display 5. When the high curve mode is previously selected, the endmill 435 is set to be used in beveling. When the frame curve is not steep and the grindstone 162b is used, a normal processing mode may be selected. When beveling is carried out in accordance with the rim having the high frame curve, the lens LE having the high lens curve is previously selected.

When the data necessary for processing can be inputted, the lens LE is held (chucked) by the lens chucks 102L and 102R, a processing start switch of the switch portion 7 is depressed to operate the apparatus. The operation control portion 50 operates the lens measuring portions 300F and 300R by the start signal and measures respective edge positions of the front and rear surfaces of the lens LE based on the target lens shape data. In the case of the bevel-finishing mode, measurement is carried out at two portions of the bevel apex and the bevel bottom in the same meridian direction. When the respective edge positions of the front and rear surfaces of the lens LE are provided, the operation control portion 50 carries out beveling calculation of calculating data on a path of a bevel formed on the lens LE based on the target lens shape data and the respective edge position data. The bevel path data is calculated by arranging the bevel apex over an entire periphery of the radius so as to divide the edge thickness by a predetermined rate. Further, the operation control portion 50 calculates an approximate bevel curve value Crv based on the data on the path of the bevel apex. The bevel curve value Crv is calculated by substituting arbitrary 4 points of the path of the bevel apex for an equation of a sphere, calculating a radius of the sphere and by a well-known curve value calculating equation based on the radius.

Figure 8:
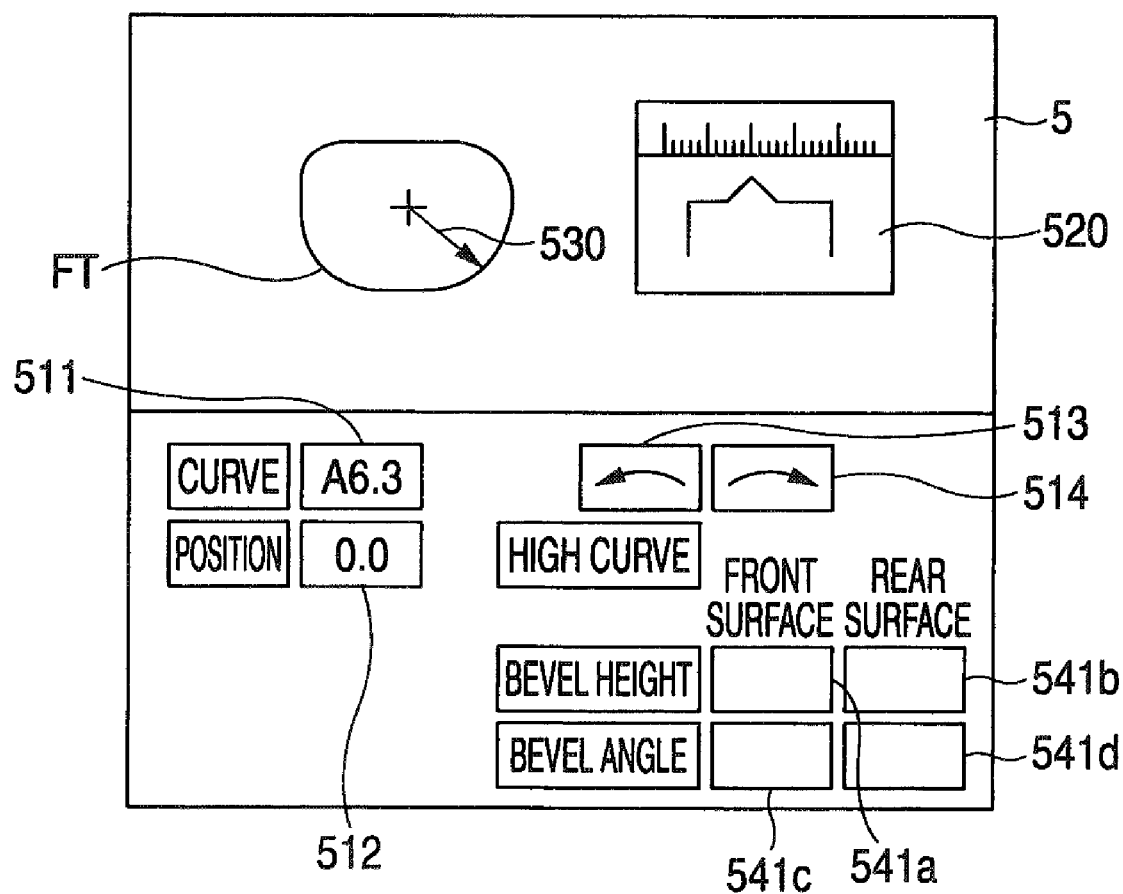
FIG. 8 is a diagram showing a simulation screen of a beveling shape.

When the beveling calculation is finished, a simulation screen capable of setting (changing) the bevel shape is displayed on the display 5 (refer to FIG. 8). In the simulation screen, the bevel curve value Crv by the beveling calculation is displayed at a column 511. The bevel curve value Crv can be changed by the column 511. Further, an amount of moving the position of the bevel apex in parallel with the front surface side or the rear surface side of the lens LE can be inputted by a column 512. Further, the front contour diagram FT and a bevel section diagram 520 are displayed on the screen. By designating the position of a cursor 530 on the front contour diagram FT by a button 513 or a button 514, the bevel section diagram 520 is changed to a state of a designated position.

In the apparatus of the embodiment, when the bevel curve value Crv=6 or more, it is set (selected) to bevel by the endmill 435. When less than Crv=6, it is set (selected) to bevel by the grindstone 162b.

A case of beveling by the grindstone 162b will simply be explained. The bevel path data is set to (Rn, θn, Hn) (n=1, 2, . . . , N). The beveling data can be provided by calculating a processing point when the lens LE is rotated based on a radius Rc of the grindstone 162b, and calculating a distance between a rotating center of the grindstone 162b and a processing center of the lens LE at this occasion (a distance between the center axes of the grindstone spindle 161 and the lens chucks 102L and 102R). The beveling data can be calculated by a well-known method described in EP 1510290 (JP-A-2005-74560) or the like, and therefore, an explanation thereof will be omitted. When the beveling data by the grindstone 162b is provided, the roughening data is provided therefrom. The roughening data is calculated as data enlarging the axis-to-axis distance of the beveling data by an amount of a predetermined processing margin.

After displaying the simulation screen of beveling, when the processing start switch of the switch portion 7 is depressed, the operation control portion 50 controls to drive the motors 145 and 150 and the like for moving the carriage 101 based on the roughening data in accordance with a processing sequence to roughen the periphery of the lens LE by the grindstone 162a. Next, the carriage 101 is controlled to move based on the data for the grindstone 162b to bevel the roughened periphery of the lens LE by the grindstone 162b. When the bevel curve value Crv is small, by processing by the grindstone 162b, the periphery can efficiently be processed while restraining the bevel from being reduced.

Next, a case of beveling by the endmill 435 will be explained. As described above, when the bevel curve value Crv=6 or more, or the high curve mode is selected, beveling by the endmill 435 is set. In beveling by the endmill 435, different from beveling by the grindstone 162b, a height hvf and an angle βf of a bevel incline vsf on the front surface side of the lens LE and a height hvr and an angle βr of a bevel incline vsr on the rear surface side of the lens LE (refer to FIG. 6) can be changed by setting columns 541a, 541b, 541c, and 541d. Respective set values are set with values so as to be the bevel shape by the grindstone 162b as initial values, and can be changed by ten keys displayed by depressing the setting column. In place of (in addition to) the angles βf and βr of the bevel incline VSf and VSr, angles of bevel feet VUf and VUr (angles relative to the X axis direction) may be made to be able to be set.

Figure 9A:
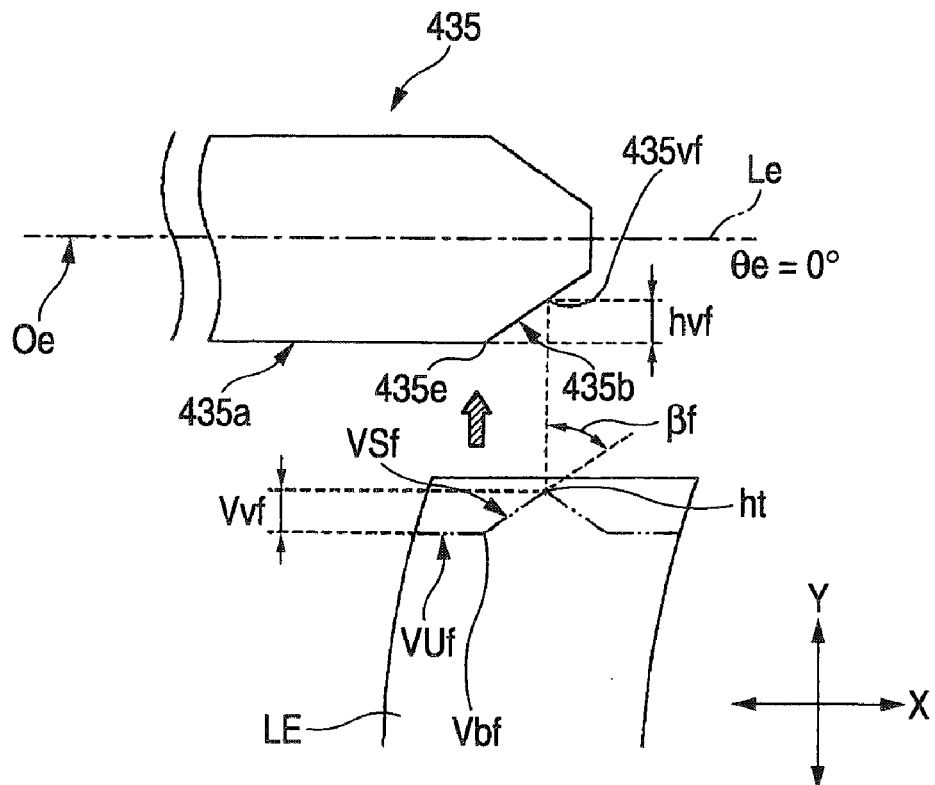
FIG. 9A and FIG. 9B are diagrams showing beveling on a front surface side of a lens by the endmill.
Figure 9B:
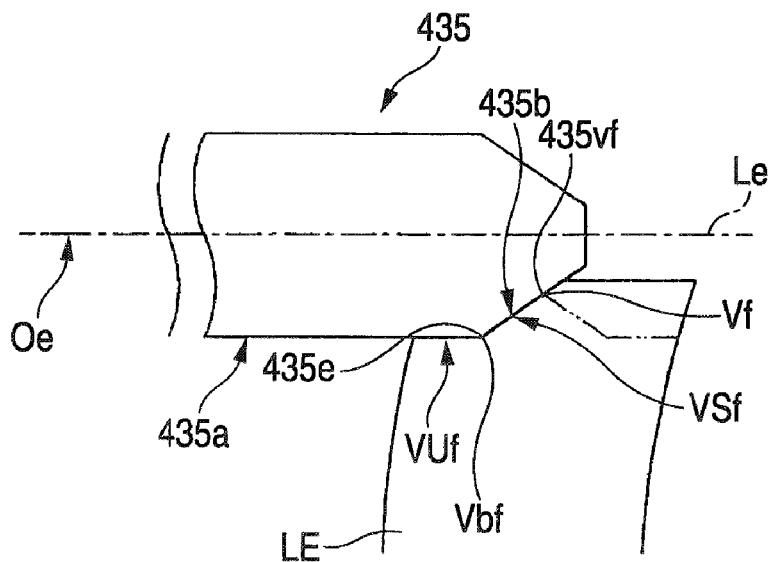
Figure 10A:
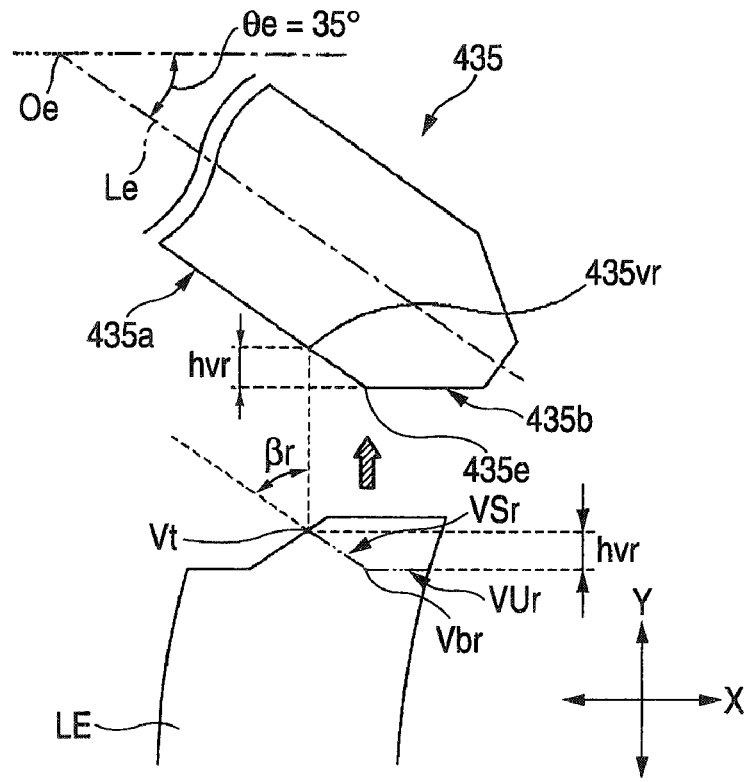
FIG. 10A and FIG. 10B are diagrams showing beveling on a rear surface side of the lens by the endmill.
Figure 10B:
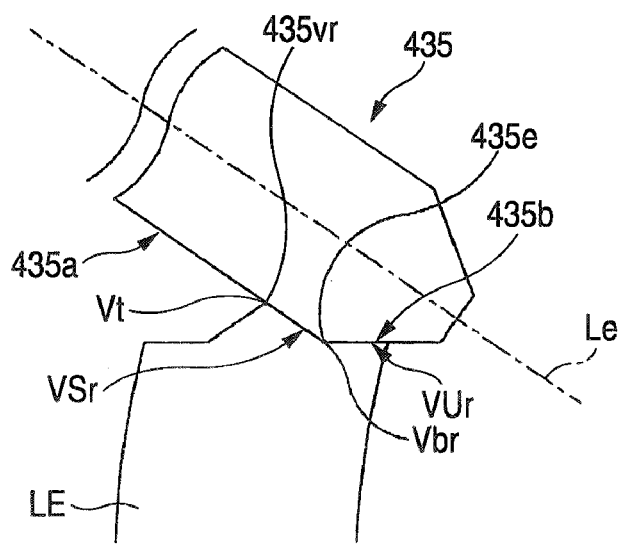

Beveling by the endmill 435 is carried out by being divided on the front surface side and on the rear surface side of the lens LE. FIG. 9A and FIG. 9B are diagrams showing beveling on the front surface side of the lens LE by the endmill 435, FIG. 10A and FIG. 10B are diagrams showing beveling on the rear surface side of the lens LE. Here, an explanation will be given by assuming that the height hvf and the angle βf of the bevel incline VSf and the height hvr and the angle βr of the bevel incline VSr are set to values the same as those of the bevel shape processed by the grindstone 162b. Further, the bevel feet VUf and VUr are assumed to be in parallel with the X axis direction. Beveling data for beveling the front and rear surfaces of the lens LE is provided as data of inclining the endmill 435 and data of moving the carriage 101 (lens chucks 102R and 102L) in the X axis and Y axis directions.

Calculation of beveling data on the front surface side of the lens LE will be explained. In beveling the front surface side of the lens LE of the embodiment, the bevel foot VUf is processed by the first edge portion 435a of the endmill 435, and the bevel incline VSf is processed by the second edge portion 435b. The inclining angle θe of the center axis Le of the endmill 435 relative to the X axis direction is provided based on the angle βf of the bevel incline VSf. According to the example of FIG. 9A and FIG. 9B, the bevel foot VUf is set to be in parallel with the X axis direction, and therefore, the angle βf is 55° and the angle θe is 0°.

Moving data for moving the carriage 101 is calculated as data of making the bevel bottom Vbf positioned at a corner 435e of the endmill 435. The bevel bottom Vbf is calculated by the bevel height hvf and the bevel angle βf by employing the bevel apex Vt as a reference. The position of the corner 435e of the endmill 435 is calculated based in the positional relationship (which is already known) of the corner 435e relative to the set inclining angle θe of the endmill 435 and the inclining center θe of the endmill 435. Further, moving data (Yfi, θfi, Xfi) (i=1, 2, . . . , N) of beveling on the front surface side of the lens LE is provided by calculating position data Xf in the X axis direction and position data Yf in the Y axis direction of positioning the bevel bottom Vbf at the corner 435e for respective small rotating angles of the lens LE based on the bevel path data (Rn, θn, Hn) (n=1, 2, . . . , N). Notation θfi designates rotating angle data of the lens LE.

Further, the moving data of beveling on the front surface side of the lens LE may be calculated to position the bevel apex Vt at a point 435vf on the second edge portion 435b. The point 435vf is calculated as a position on the first edge portion 435a shifted from the corner 435e to a side of the center axis Le by an amount of the bevel height hvf. Further, the moving data (Yfi, θfi, Xfi) (i=1, 2, . . . , N) is provided by calculating the position data Xf in the X axis direction and the position data Yf in the Y axis direction to position the bevel apex Vt at the point 435vf based on the bevel path data (Rn, θn, Hn) (n=1, 2, . . . , N).

Beveling on the front surface side of the lens LE will be explained. The operation control portion 50 controls to drive the motor 405 of the beveling and grooving portion 400 to move the holder 430 from the escaping position to the processing position (a position at which the center axis Le of the endmill 435 is disposed on the XY axes plane). Further, the center axis Le of the endmill 435 (rotating shaft 431) is disposed in parallel with the X axis direction based on the inclining data of the endmill 435 (θe=0°) by controlling to drive the motor 416. Under the state, the operation control portion 50 controls to move the carriage 101 based on the moving data (Yfi, θfi, Xfi) (i=1, 2, . . . , N) of beveling to move the lens LE such that the bevel bottom Vbf is disposed at the corner 435e of the rotating endmill 435 as shown by FIG. 9B. Thereby, the bevel incline VSf and the bevel foot VUf on the front surface side of the lens LE are simultaneously processed (formed).

When beveling on the front surface side of the lens LE has been finished, the operation control portion 50 carries out beveling on the rear surface side of the lens LE (the order may be reversed). Calculation of the beveling data on the rear surface side of the lens LE will be explained. In beveling the rear surface side of the lens LE of the embodiment, the bevel incline VSr is processed by the first edge portion 435a of the endmill 435, and the bevel foot VUr is processed by the second edge portion 435b. The inclining angle θe of the endmill 435 at this occasion is provided based on the angle βr of the bevel incline VSr. According to the example of FIG. 10A and FIG. 10B, the bevel foot VUr is set to be in parallel with the X axis direction, and therefore, the angle βr is 55° and the angle θe is −35°.

Further, the moving data for moving the carriage 101 is calculated as data of positioning the bevel bottom Vbr at the corner 435e of the endmill 435. The bevel bottom Vbr is calculated by set values of the bevel height hvr and the bevel angle βr with employing the bevel apex Vt as a reference. By setting the inclining angle θe of the endmill 435, the position of the corner 435e of the endmill 435 is calculated based on the set inclining angle θe of the endmill 435 and the positional relationship of the corner 435e relative to the inclining center θe of the endmill 435. Further, the moving data (Yri, θri, Sri) (i=1, 2, ..., N) of beveling on the rear surface side of the lens LE is provided by calculating the position data Xr in the X axis direction and the position data Yr in the Y axis direction for positioning the bevel bottom Vbr at the corner 435e for respective small rotating angles of the lens LE based on the bevel path data (Rn, θn, Hn) (n=1, 2, ..., N). Notation θr designates rotating angle data of the lens LE.

Further, also the moving data of beveling on the rear surface side of the lens LE may be calculated to position the bevel apex Vt at a point 435vr on the first edge portion 435a. The point 435vr is calculated as a position on the first edge portion 435a shifted from the corner 435e to the side of the center axis Le by an amount of the bevel height hvr.

Beveling of the rear surface side of the lens LE will be explained. The operation control portion 50 inclines the endmill 435 based on the inclining data of the endmill 435 (θe=−35°) by controlling to drive the motor 416. Under the state, the operation control portion 50 controls to move the carriage 101 based on the moving data of beveling, and moves the lens LE such that the beveling bottom Vbr is disposed at the corner 435e of the rotating endmill 435 as shown by FIG. 10B. Thereby, the bevel incline VSr and the bevel foot VUr on the rear surface side of the lens LE are simultaneously processed (formed).

Further, in beveling of the rear surface side of the lens LE, when a width of the bevel foot VUr is larger than the width Se (which is already known) of the second edge portion 435b, moving data of moving the carriage 101 is calculated to process a remaining portion of the bevel foot VUr to process by the second edge portion 435b.

Further, the apparatus may be constituted such that in beveling of the rear surface side of the lens LE, the bevel foot VUr is processed by the first edge portion 435a of the endmill 435 and the bevel incline VSr is processed by the second edge portion 435b.

Further, in beveling by the endmill 435 of the apparatus, different from beveling by the grindstone 162b, the height hvf and the angle βf of the bevel incline VSf on the front surface side of the lens LE and the height hvr and the angle βr of the bevel incline VSr on the rear surface side of the lens LE can be changed. An example thereof will be explained in reference to FIG. 11A through FIG. 11C.

Figure 11A:
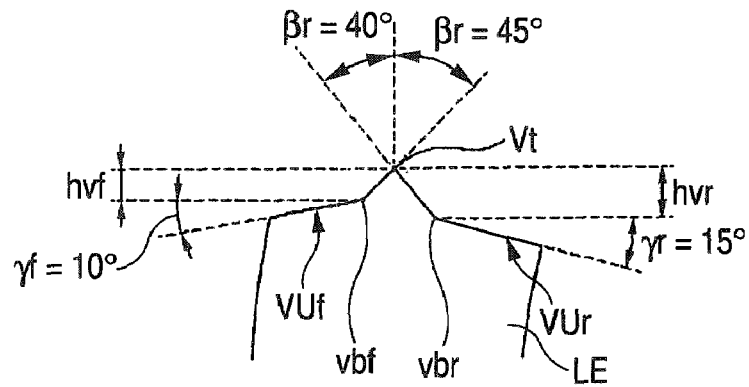
FIG. 11A through FIG. 11C are diagrams showing beveling in which a bevel height and a bevel angle differ on the front surface side and the rear surface side of the lens.

According to an example of FIG. 11A, the bevel height hvf is set to be smaller than the bevel height hvr, the bevel angle βf is set to 45° and the bevel angle βr is set to 40°. In this case, an angle γf relative to the X axis direction of the bevel foot VUf becomes 10° and an angle γr relative to the X axis direction of the bevel foot VUr becomes 15°. The respective set values can be changed by the setting columns 541a through 541d of the display 5.

Figure 11B:
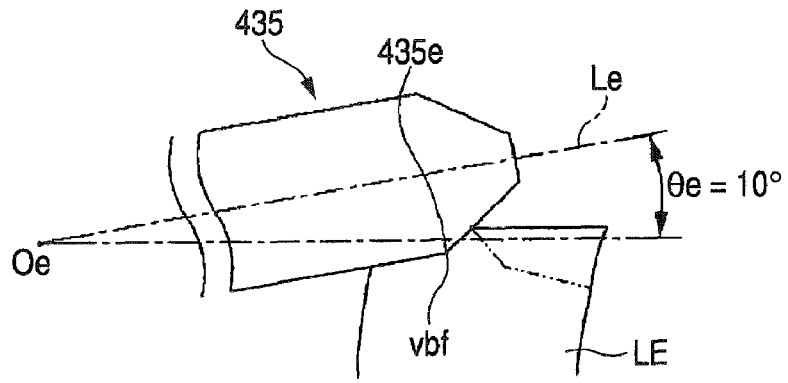

FIG. 11B is a diagram showing a state of the endmill 435 in beveling of the front surface side of the lens LE. The inclining angle θe of the endmill 435 is set to 10° similar to the angle γf. In the moving data, the position of the corner 435e of the endmill 435 is calculated based on the inclining angle θe, the position of the bevel bottom Vbf is calculated based on the bevel height hvf and the beveling angle βf and calculated as data for making the both coincides with each other.

Figure 11C:
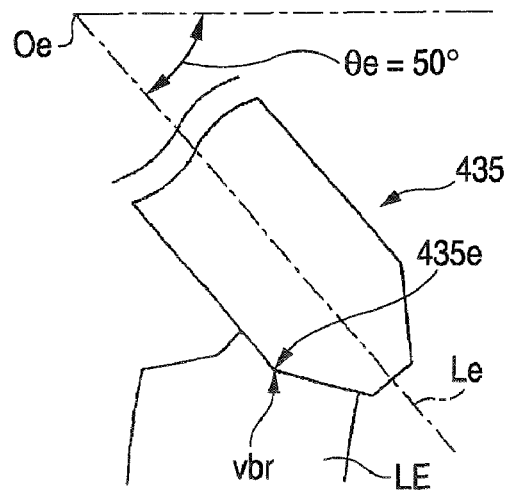

FIG. 11C is a diagram showing a state of the endmill 435 in beveling of the rear surface side of the lens LE. The inclining angle θe of the endmill 435 is set to −50° since the angle βr is 40°. In the moving data, the position of the corner 435e of the endmill 435 is calculated based on the inclining angle θe, the position of the bevel bottom Vbr is calculated based on the bevel height hvr and the bevel angle βr and is calculated as data for making the both coincides with each other.

Further, in beveling by the endmill 435 of the apparatus, the bevel shape (also including the shape of the bevel foot) can be a shape in accordance with the lens curve by changing angles of the bevel incline of the front and rear surfaces of the lens LE in correspondence with the radius angle θn (radius angle θn of bevel path data) of the target lens shape. An example thereof will be explained in reference to FIG. 12A through FIG. 12C.

Figure 12A:
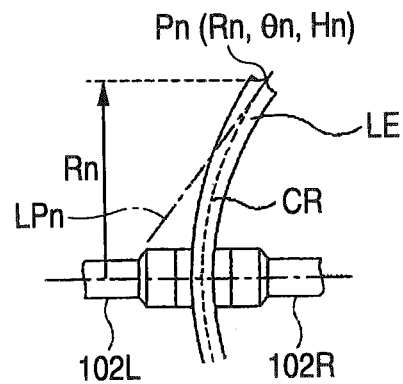
FIG. 12A through FIG. 12C are diagrams showing beveling in accordance with a lens curve.
Figure 12B:
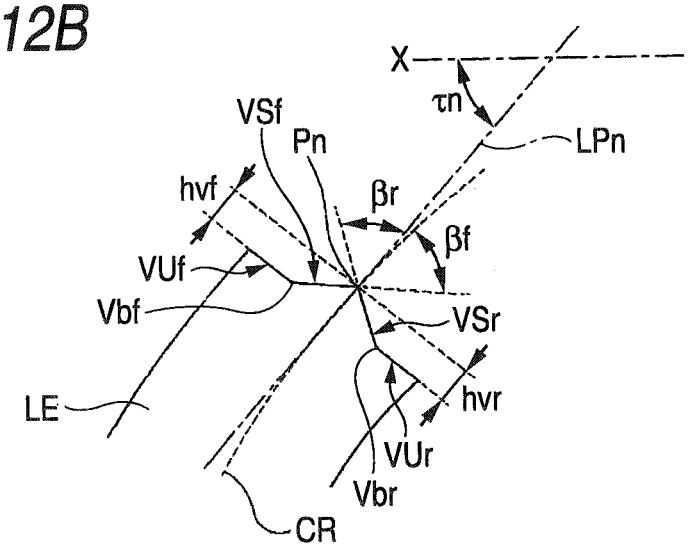

In FIG. 12A, notation Pn designates a processing point of the bevel apex Vt at a certain radius angle θn, which is provided based on the bevel path data (Rn, θn, Hn) (n=1, 2, ..., N). Notation Lpn designates a tangential line of the bevel curve CR at the processing point Pn. The tangential line Lpn can be calculated by substituting arbitrary 4 points of the path of the bevel apex for the equation of the sphere by a procedure the same as that in calculating the bevel curve value Crv and calculating the radius and the center of the sphere. FIG. 12B is a diagram enlarging the bevel of FIG. 12A. An angle made by the tangential line Lpn and the X axis direction is designated by notation ιn. In FIG. 12B, the bevel angle βf and the bevel angle βr are angles relative to the tangential line Lpn. For example, both of the bevel angles βf and βr are set to 55° (αe-90°) the same as that of the grindstone 162b such that directions of the bevel feet VUf and VUr become a direction orthogonal to the tangential line Lpn. Further, the bevel height hvf and the bevel height hvr are heights in the direction of the tangential line Lpn. For example, the bevel heights hvf and hvr are a height the same as that of the grindstone 162b.

A calculation of beveling data when the processing point Pn of the above-described bevel shape is processed will be explained in reference to FIG. 12C. The inclining angle θe of the endmill 435 (center axis Le) when the bevel foot VUf and the bevel incline VSf on the front surface side of the lens LE is simultaneously processed is calculated based on the angle ιn, the angle βf and the angle αe. That is, the inclining angle θe becomes as follows.

$$\theta e = -(180° - \alpha e + \beta f - \iota n)$$

Further, in the moving data for moving the carriage 101, the position of the corner 435e of the endmill 435 is calculated based on the angle θe and is provided based on the bevel path data (Rn, θn, Hn) (n=1, 2, ..., N) of the processing point Pn to position the bevel bottom Vbf at the corner 435e.

Further, the inclining angle θe of the endmill 435 (center axis Le) when the bevel foot VUr and the bevel incline VSr on the rear surface side of the lens LE is simultaneously processed is calculated by the following equation.

$$\theta e = -(180° - \beta r - \iota n)$$

Further, in the moving data for moving the carriage 101, the position of the corner 435e of the endmill 435 is calculated based on the angle θe and is provided based on the bevel path data (Rn, θn, Hn) (n=1, 2, ..., N) of the processing point Pn to position the bevel bottom Vbr at the corner 435e.

Figure 13:
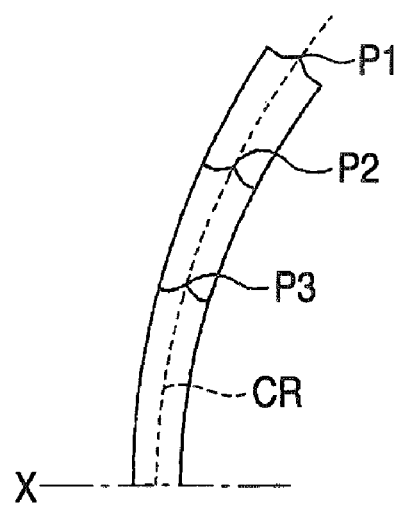
FIG. 13 is a diagram showing bevel shapes at processing points having different radius lengths.

The above-described operation is carried out for processing points of respective radius angles θn of the beveling path data. FIG. 13 illustrates an example of bevel shapes formed at respective processing points P1 through P3 having different radius lengths. In this way, by beveling by changing the inclining angle θe of the endmill 435 in accordance with the radius length Rn for respective radius angles θn of the bevel path data, the bevel along the bevel curve can be formed while restraining the bevel from being reduced.

Further, the bevel angles βf and βr maybe set to different set values. Further, also the bevel heights hvf and hvr may be set to different set values. Further, the set values may be changed in accordance with the radius length Rn of the bevel path data.

Figure 12C:
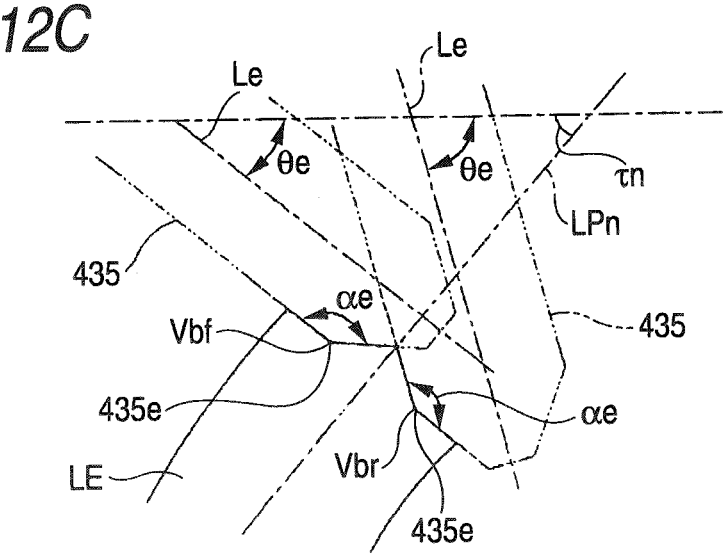

Further, although in forming the bevel of FIG. 12A through FIG. 12C, the bevel angles βf and βr are set with employing as a reference the tangential line Lpn of the bevel curve CR at the processing point Pn, there is a case in which when the bevel curve becomes successively steep (for example, in a case that the bevel curve value Crv exceeds 8), it is preferable to more or less correct the bevel curve. In this case, by multiplying the bevel curve CR by a certain coefficient k (for example, a coefficient by which the bevel curve value Crv becomes 8 through 4) and a tangential line of a slightly gradual bevel curve at the processing point Pn may be employed as a reference. Or, by multiplying the angle ιn calculated by the tangential line Lpn by a certain coefficient k, the angle ιn may be calculated to be slightly large. Further, the coefficient k may be made to be able to set at the simulation screen. In the simulation screen, the sectional shape of the bevel at the edge position designated by the cursor 530 can be confirmed by the bevel section diagram 520. That is, inclinations of the bevel foot and the bevel incline relative to the X axis direction and the like can be confirmed.

Figure 14:
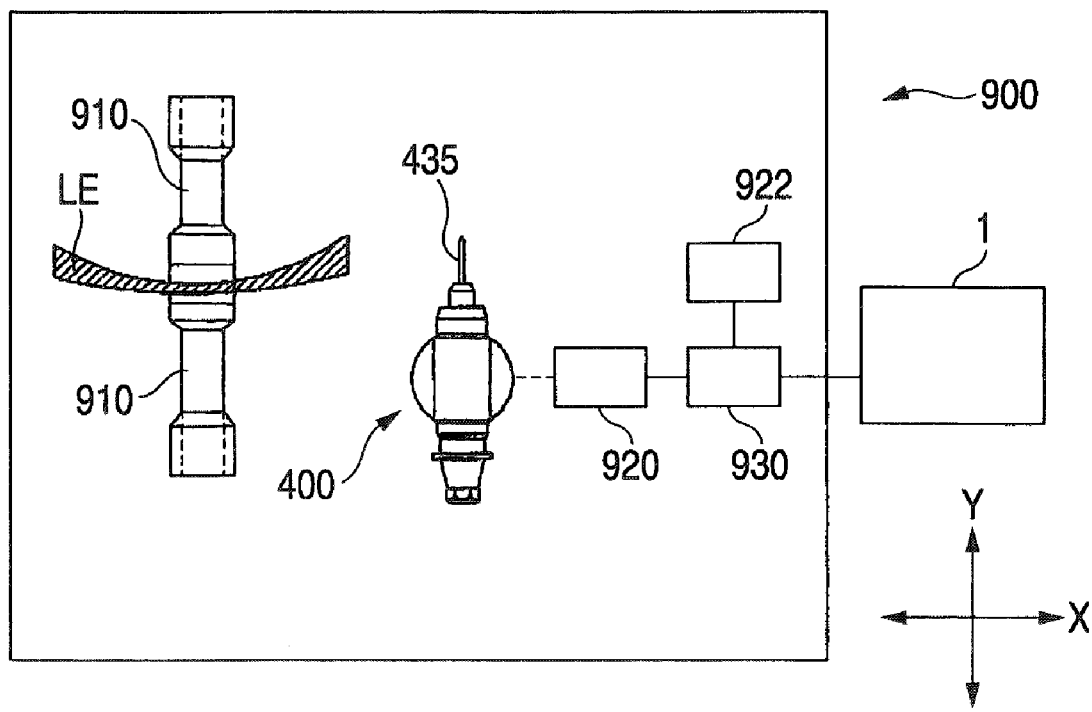
FIG. 14 is a diagram showing an example of providing a beveling and grooving portion at an auxiliary processing apparatus.

Further, although according to the above-described embodiment, the processing apparatus (hereinafter, a main processing apparatus) including the grindstone 162 including the grindstone 162b having the beveling groove, the carriage portion 100 having the lens chucks 102L and 102R, the lens measuring portions 300F and 300R and the like is constructed by a structure including the beveling and grooving portion 400 having the endmill 435, an auxiliary processing apparatus separate from the main processing apparatus may be constructed by a structure including the beveling and grooving portion 400. FIG. 14 is a diagram showing the example.

In FIG. 14, an auxiliary processing apparatus 900 includes two lens chucks 910 for holding (chucking) the lens LE, the beveling and grooving portion 400 having the endmill 435, a moving mechanism portion 920 for moving the beveling and grooving portion 400 in the X axis and Y axis directions relative to the lens chuck 910 (changing a positional relationship between the lens chuck 910 and the endmill 435), and a control unit 930 for controlling the beveling and grooving portion 400, the moving mechanism portion 920 and the like. The lens chucks 910 are rotated in synchronism with each other by a rotating mechanism portion, not illustrated. The control unit 930 is connected to the main processing apparatus 1 communicatably by wire or wireless. Further, the control unit 930 is connected with a display 922 similar to the display 5, the display 922 is displayed with a simulation screen similar to FIG. 8 to be able to set the beveling shape.

An explanation will be given of a case in which the main processing apparatus 1 does not include the beveling and grooving portion 400 having the endmill 435 and the beveling is carried out by the auxiliary processing apparatus 900. First, target lens shape data, layout data, processing conditions and the like are inputted on the side of the main processing apparatus 1 and the shapes of the front and rear surfaces of the lens LE are measured by the lens measuring portions 300F and 300R. Further, when the bevel curve value Crv based on a result of the measurement is equal to or larger than 6, or when the high curve mode is selected, the operation control portion 50 sets such that beveling is carried out on the side of the auxiliary processing apparatus 900 after roughening, and only roughening is carried out on the side of the main processing apparatus 1. Next, the operation control portion 50 transmits basic data (including measured data by the lens measuring portions 300R and 300F or bevel path data calculated based on the measured data) necessary for calculating the beveling data on the side of the auxiliary processing apparatus 900 to the auxiliary processing apparatus 900. Further, the operation control portion 50 makes the display 5 display messages or the like of end of processing on the side of the main processing apparatus 1 and instruction of processing on the side of the auxiliary processing apparatus 900.

The lens LE roughened on the side of the main processing apparatus 1 is held by the lens chucks 910 on the side of the auxiliary processing apparatus 900. When an instruction of starting to bevel is carried out, the control unit 930 calculates the beveling data based on data and the like transmitted from the side of the main processing apparatus 1. Further, the control unit 930 calculates the beveling data such that the endmill 435 is moved in the X axis and Y axis directions relative to the lens chuck 910. Further, the control unit 930 controls to bevel the front surface side of the lens LE and bevel the rear surface side of the lens LE by changing the positional relationship between the lens chuck 910 and the endmill 435 by controlling the inclining angle of the endmill 435, the moving mechanism 920 and the like based on the beveling data.

What is claimed is:

1. An eyeglass lens processing apparatus for processing a periphery of an eyeglass lens, the apparatus comprising:
   a lens chuck that is configured to hold the lens;
   an endmill comprising a tip that is configured to bevel the periphery of the lens;
   wherein the tip of the endmill comprises a first edge portion that constitutes a cylindrical surface edge during high speed rotation of the endmill and a second edge portion that constitutes a conical surface edge during high speed rotation of the endmill;
   wherein an angle between the cylindrical surface edge and the conical surface edge is an obtuse angle;
   wherein the cylindrical surface edge and the conical surface edge are configured to bevel the periphery of the lens to simultaneously form a bevel incline and a bevel foot such that the bevel incline and the bevel foot form an angle that coincides with the obtuse angle between the cylindrical surface edge and the conical surface edge;
   a moving unit comprising an inclining unit that is configured to incline the endmill relative to the lens chuck for changing a positional relationship between the lens chuck and the endmill;
   an operating portion that is configured to calculate front surface side beveling data including an inclining angle of the endmill for simultaneously forming the bevel incline and the bevel foot on a front surface side of the lens by the endmill, and rear surface side beveling data including an inclining angle of the endmill for simultaneously forming the bevel incline and the bevel foot on a rear surface side of the lens by the endmill; and a control portion that is configured to control the moving unit based on the front surface beveling data to simultaneously form the bevel incline and the bevel foot on the front surface side of the lens by beveling the front surface side of the lens and is configured to control the moving unit based on the rear surface side beveling data to simultaneously form the bevel incline and the bevel foot on the rear surface side of the lens by beveling the rear surface side of the lens.

2. The eyeglass lens processing apparatus according to claim 1 further comprising a setting portion that sets bevel heights and bevel angles of the front and the rear surface sides of the lens, respectively, wherein the operating portion calculates the front surface side beveling data and the rear surface side beveling data based on the set bevel heights and the set bevel angles.

3. The eyeglass lens processing apparatus according to claim 1 further comprising a beveling grindstone having a beveling groove in a V-like shape and grinding surfaces on opposite sides of the beveling groove, wherein the angle between the cylindrical surface edge and the conical surface edge substantially coincides with an angle made by the beveling groove and the grinding surface of the beveling grindstone.

4. The eyeglass lens processing apparatus according to claim 3 further comprising selecting means for selecting to use either of the beveling grindstone and the endmill in beveling.

5. The eyeglass lens processing apparatus according to claim 1, wherein the second edge portion includes a front end surface that is orthogonal to a rotational center axis of the endmill.

6. The eyeglass lens processing apparatus according to claim 5, wherein the difference in length between a radius of the endmill at the first edge portion and a radius of the endmill at the front end is larger than the height of the bevel to be formed on the periphery of the lens.

* * * * *